(12) United States Patent
Pittman

(10) Patent No.: US 10,004,961 B2
(45) Date of Patent: Jun. 26, 2018

(54) GOLF CLUB CARRIER

(71) Applicant: ROTACADDY LIMITED, Leeds (GB)

(72) Inventor: John Pittman, Leeds (GB)

(73) Assignee: ROTACADDY LIMITED, Yorkshire (GB)

( * ) Notice: Subject to any disclaimer, the term of this patent is extended or adjusted under 35 U.S.C. 154(b) by 194 days.

(21) Appl. No.: 14/913,425

(22) PCT Filed: Aug. 14, 2014

(86) PCT No.: PCT/GB2014/052506
§ 371 (c)(1),
(2) Date: Feb. 22, 2016

(87) PCT Pub. No.: WO2015/025136
PCT Pub. Date: Feb. 26, 2015

(65) Prior Publication Data
US 2016/0199708 A1 Jul. 14, 2016

(30) Foreign Application Priority Data
Aug. 22, 2013 (GB) .................................. 1315039.6

(51) Int. Cl.
*A63B 55/40* (2015.01)
*B65G 65/00* (2006.01)
*A63B 55/00* (2015.01)

(52) U.S. Cl.
CPC .............. *A63B 55/40* (2015.10); *A63B 55/00* (2013.01); *B65G 65/00* (2013.01)

(58) Field of Classification Search
CPC ................................ A63B 55/00; A63B 55/40
See application file for complete search history.

(56) References Cited

U.S. PATENT DOCUMENTS

| | | | | |
|---|---|---|---|---|
| 35,404 A | | 5/1862 | Vaughan | |
| 2,806,711 A | * | 9/1957 | Jacobs | B62L 31/262 211/70 |
| 2,890,061 A | * | 6/1959 | Watson | A63B 55/60 280/13 |
| 2,911,228 A | * | 11/1959 | Green | A63B 55/60 280/13 |
| 3,353,838 A | * | 11/1967 | Schmid | A63B 55/10 280/47.19 |
| 3,425,708 A | * | 2/1969 | Sato | A63B 55/60 280/47.19 |

(Continued)

FOREIGN PATENT DOCUMENTS

| | | |
|---|---|---|
| GB | 2 278 062 A | 11/1994 |
| GB | 2467566 A | 8/2010 |

(Continued)

OTHER PUBLICATIONS

Sep. 7, 2017 Office Action issued in U.S. Appl. No. 13/148,119.

(Continued)

*Primary Examiner* — Kaitlin S Joerger
(74) *Attorney, Agent, or Firm* — Oliff PLC

(57) ABSTRACT

A golf club carrier includes seven inner receptacles and seven out receptacles. The carrier is rotatable about an axis. Two ejectors are caused to be raised simultaneously by a single actuator with one ejector raising a golf club and the other ejector rising in a space between two receptacles.

17 Claims, 4 Drawing Sheets

(56) References Cited

U.S. PATENT DOCUMENTS

| | | | |
|---|---|---|---|
| 4,012,051 A | 3/1977 | Embinder | |
| 4,029,136 A | 6/1977 | Jacoby | |
| 4,111,248 A * | 9/1978 | Leichhardt | A63B 55/00 206/315.6 |
| 4,245,684 A * | 1/1981 | Street | A63B 55/00 109/51 |
| 4,442,937 A | 4/1984 | Delauder | |
| 4,673,082 A * | 6/1987 | Hemme | A63B 55/00 206/315.3 |
| 4,709,814 A * | 12/1987 | Antonious | A63B 55/00 206/315.3 |
| 4,750,617 A * | 6/1988 | Anderson | A63B 55/00 206/315.2 |
| 4,753,446 A * | 6/1988 | Mills | A63B 55/00 206/315.6 |
| 4,915,221 A | 4/1990 | Spangler | |
| 5,005,743 A * | 4/1991 | Ramsay | A45C 7/0031 190/104 |
| 5,028,909 A | 7/1991 | Miller | |
| 5,029,703 A * | 7/1991 | Dulyea, Sr. | A63B 55/00 206/315.3 |
| 5,060,796 A * | 10/1991 | Brooks, III | A63B 55/00 206/315.6 |
| 5,102,529 A * | 4/1992 | Hickin | A63B 55/00 206/315.3 |
| 5,168,992 A * | 12/1992 | Bowdy | A63B 55/00 206/315.4 |
| 5,213,364 A * | 5/1993 | Theckston | A63B 55/00 206/315.6 |
| 5,215,194 A * | 6/1993 | Blanford | A63B 55/00 206/315.3 |
| 5,222,596 A * | 6/1993 | Jordan | A63B 55/00 206/315.3 |
| 5,244,086 A * | 9/1993 | Welch | A63B 55/00 150/159 |
| 5,303,888 A * | 4/1994 | Seop | A63B 55/53 206/315.6 |
| 5,366,075 A * | 11/1994 | Mills | A63B 55/00 206/315.6 |
| 5,465,840 A * | 11/1995 | Joh | A63B 55/00 206/315.3 |
| 5,565,845 A | 10/1996 | Hara | |
| 5,738,208 A * | 4/1998 | Roubal | A63B 55/00 150/159 |
| 5,816,397 A * | 10/1998 | Pratt | A63B 55/00 206/315.3 |
| 5,911,322 A * | 6/1999 | Lombardo | A63B 55/00 206/315.3 |
| 6,006,904 A | 12/1999 | Jacobsen | |
| 6,352,154 B1 | 3/2002 | Miura | |
| 6,371,291 B1 * | 4/2002 | Laffy | A63B 55/00 206/315.3 |
| 6,381,998 B1 * | 5/2002 | Good | A63B 55/00 206/315.3 |
| 6,405,891 B1 | 6/2002 | Christensen et al. | |
| 6,407,668 B1 | 6/2002 | Beham | |
| 6,464,076 B2 * | 10/2002 | Tan | A63B 55/00 206/315.2 |
| 6,615,982 B1 * | 9/2003 | Stewart | A63B 55/00 206/315.3 |
| 6,622,859 B2 * | 9/2003 | Morgenstern | A63B 55/00 206/315.3 |
| 6,659,477 B2 * | 12/2003 | Jung | A63B 55/00 206/315.3 |
| 7,293,677 B2 | 11/2007 | Wempe et al. | |
| 8,544,642 B1 * | 10/2013 | Lytle | A45F 3/02 150/159 |
| 8,991,598 B2 * | 3/2015 | Whitworth | A63B 55/408 206/315.1 |
| 2003/0106817 A1 | 6/2003 | Buckley | |
| 2006/0138161 A1 | 6/2006 | Wempe et al. | |
| 2008/0169211 A1 | 7/2008 | Franz | |
| 2009/0033050 A1 | 2/2009 | Ting | |
| 2009/0209358 A1 | 8/2009 | Niegowski | |

FOREIGN PATENT DOCUMENTS

| | | |
|---|---|---|
| JP | H01-126984 A | 5/1989 |
| WO | 95/21658 A1 | 8/1995 |
| WO | 96/01668 A1 | 1/1996 |
| WO | 01/03799 A1 | 1/2001 |
| WO | 2010/089602 A1 | 8/2010 |

OTHER PUBLICATIONS

Oct. 15, 2014 International Search Report issued in International Patent Application No. PCT/GB2014/052506.

Feb. 23, 2016 International Preliminary Report on Patentability issued in International Patent Application No. PCT/GB2014/052506.

Feb. 7, 2014 Search Report issued in British Patent Application No. 1315039.6.

May 12, 2009 Search Report issued in British Patent Application No. 0901921.7.

Nov. 24, 2009 Search Report issued in British Patent Application No. 0913088.1.

Apr. 21, 2010 International Search Report issued in International Patent Application No. PCT/GB2010/050182.

Aug. 9, 2011 International Preliminary Report on Patentability issued in International Patent Application No. PCT/GB2010/050182.

Mar. 18, 2016 Office Action issued in U.S. Appl. No. 13/148,119.

U.S. Appl. No. 13/148,119, filed Oct. 21, 2011 in the name of Pittman.

Aug. 11, 2016 Office Action issued in U.S. Appl. No. 13/148,119.

* cited by examiner

GOLF CLUB CARRIER

The present invention relates to a golf club carrier and a method of operating a golf club carrier.

WO 2010/089602 discloses a golf club carrier in which a series of golf clubs are arranged around a circumference so as the golf club carrier is rotatable and an ejector is able to raise or lower a particular golf club when that golf club is located over an ejector. Normally a golf player has 14 clubs in a bag. When the golf clubs are located around a common circumference the size of the bag is considerable.

It is an object of the present invention to attempt to overcome the problems associated with the prior art. It is a particular aim to provide a golf club carrier having reduced size and weight.

According to the present invention there is provided a golf club carrier and method as set forth in the appended claims. Other features of the invention will be apparent from the dependent claims, and the description which follows.

According to one aspect of the present invention a golf club carrier includes a plurality of receptacles each for receiving a golf club, at least some inner receptacles being mounted inwardly of at least some outer receptacles and at least two ejectors being arranged, in use, to rise and bear against and lift the base of a club in each receptacle as required.

Advantageously the location of the receptacles on an inner and outer region allow the golf club carrier to be more compact. Suitably, the receptacles are spaced on a circular path. Here there is an inner circumference upon which the inner receptacles are arranged and an outer circumference upon which the outer receptacles are arranged. It will be appreciated that the number of receptacles will be suitable for the number of golf clubs desired to be carried, but typically there may be seven inner and seven outer receptacles.

The receptacles may be rotatable about an axis relative to a base region. The relative rotation may be arranged, in use, to align a particular receptacle over and ejector, in order that, in use, a selected receptacle is able to rise. Suitably, the inner and outer receptacles are mounted fast to each other so that they rotate as a single unit. The inner receptacles may be mounted about a circumference to the rotational axis and the outer receptacles may be mounted about a greater circumference to that axis than the inner receptacles. Suitably, the receptacles on the inner circumference are spaced at angular intervals. Also the receptacles on the outer circumference are suitably spaced at angular intervals. Advantageously, the inner and outer receptacles may be offset such that when a receptacle on the inner circumference is aligned with the ejector, the ejector arranged to act on the outer receptacles is not aligned with a receptacle. This allows a single actuator to be employed to operate both ejectors, wherein only a club within the receptacle aligned with the ejector will rise. Consequently, the correct club can be selected determined on the rotational position of the receptacles and no complex additional control is required to raise the correct ejector. Furthermore the two ejectors sharing a common actuator allows the golf club carrier to be more compact.

The outer dimension of the inner receptacles may be spaced circumferentially from the outer dimensions of the outer receptacles.

The outer dimensions of the inner receptacles may be spaced in a radial direction from the outer dimensions of the inner receptacles.

Each inner and each outer receptacle may be spaced in a circumferential direction by distance at least equal to the periphery of an inner and an outer ejector respectively.

The inner and outer ejectors maybe arranged, in use, to rise simultaneously with one ejector rising up into a receptacle and the other ejector passing upwardly between two receptacles.

According to a further aspect of the present invention method of operating a golf club carrier which includes a plurality of receptacles at least some of which have a golf club therein and in which at least some of the receptacles are inner receptacles mounted inwardly of at least some outer receptacles comprises raising at least one club in one of the inner or outer receptacles by one of a plurality of ejectors.

The receptacles may be rotatable about an axis relative to the base region and the method may comprise causing that relative rotation to align a particular receptacle over an ejector and raising that ejector to cause a club in the receptacle to rise. The inner receptacles may be mounted about a circumference to the rotational axis inwards of the outer receptacles which outer receptacles are mounted about a greater circumference than the inner receptacles and in which the outside dimension of the inner receptacles are spaced circumferentially from the outside dimension of the outer receptacles and in which the outside dimensions of the inner receptacles are spaced in a radial direction from the outside dimension of the inner receptacles, the method comprising causing relative rotation of the base region and the receptacles and in which at least each inner and each outer receptacle are spaced in a circumferential direction by distance at least equal to the periphery of an ejector comprising raising two ejectors simultaneously to cause one ejector to rise up inside one inner or outer receptacle with the other ejector rising up in a space between two adjacent receptacles of the other of the inner or outer receptacles.

The method may comprise lowering at least one ejector after a club has been removed from a particular receptacle.

The present invention includes a method as herein referred to when using a golf club carrier as herein referred to.

It will be appreciated that although the exemplary embodiments have been described in relation to at least two rows of receptacles, there may be three or more rows, such as three circumferential paths forming an inner ring, middle ring and outer ring of receptacles.

The present invention can be carried into practice in various ways but one example will now be described with reference to the accompanying drawings, in which.

Figure 1:
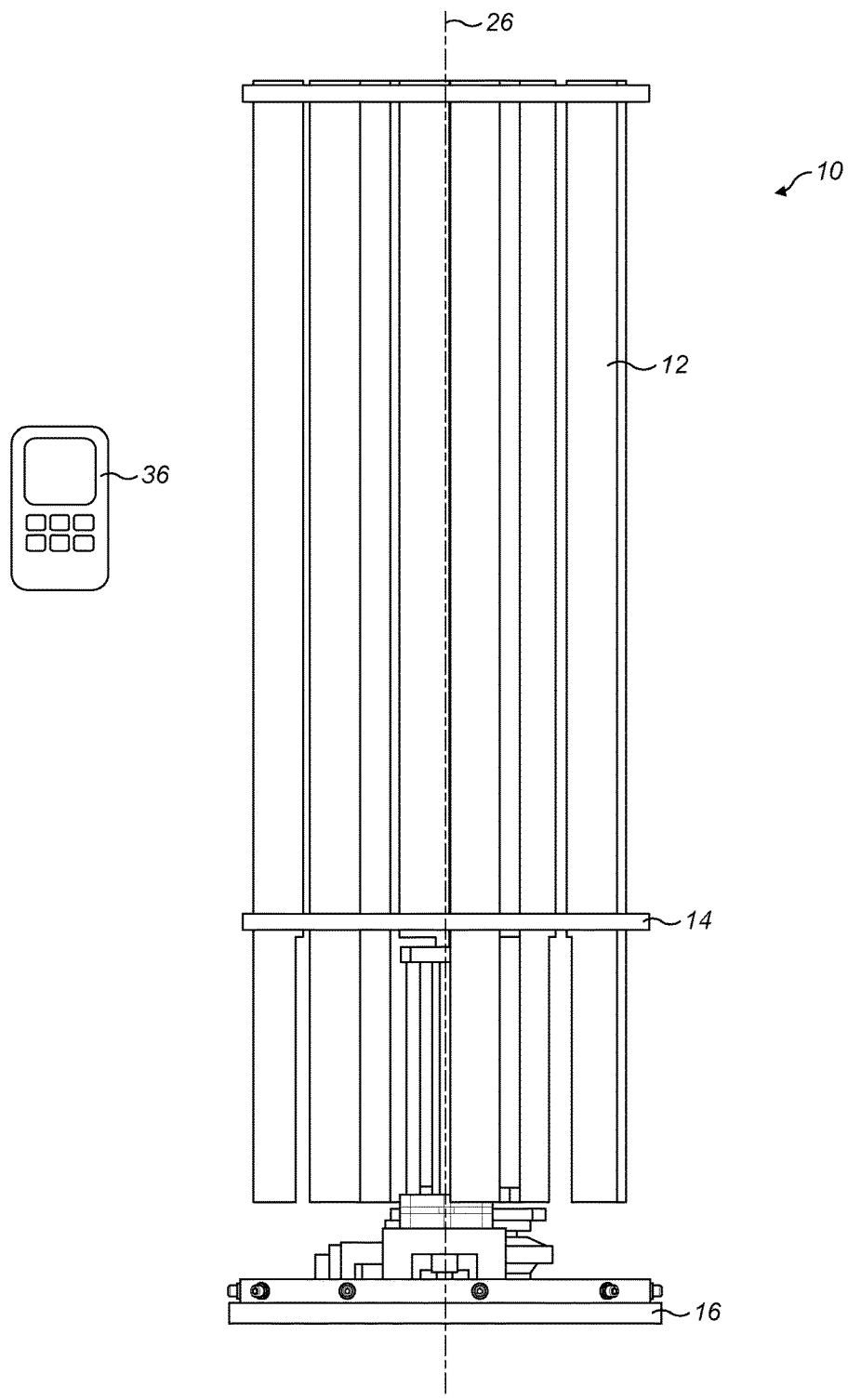
FIG. 1 is a side view of a golf club carrier 10.
Figure 2:
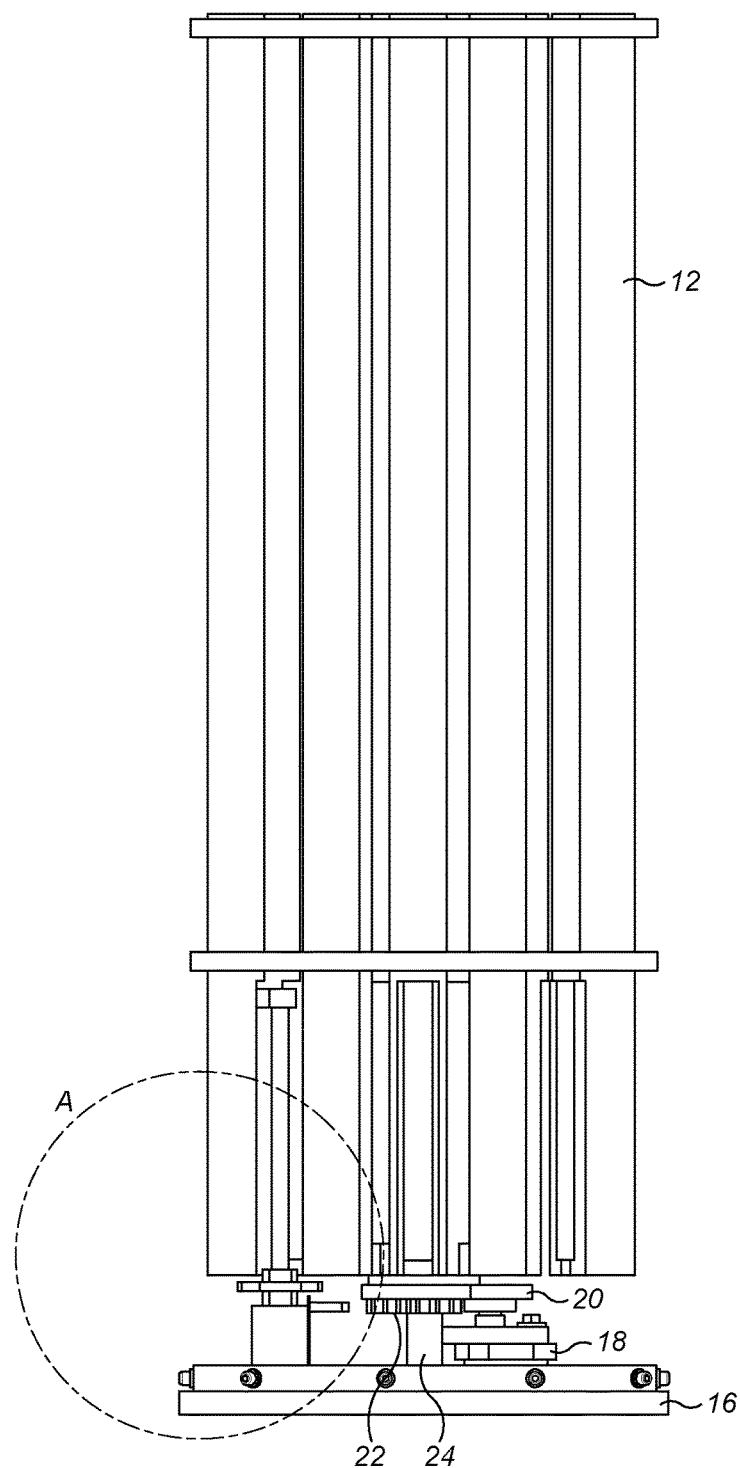
FIG. 2 is a side view of a golf club carrier 10 at 90° to the view in FIG. 1.
Figure 3:
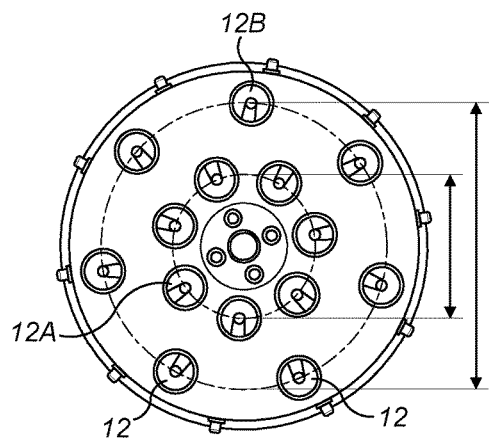
FIG. 3 is a plan view of FIG. 2.
Figure 4:
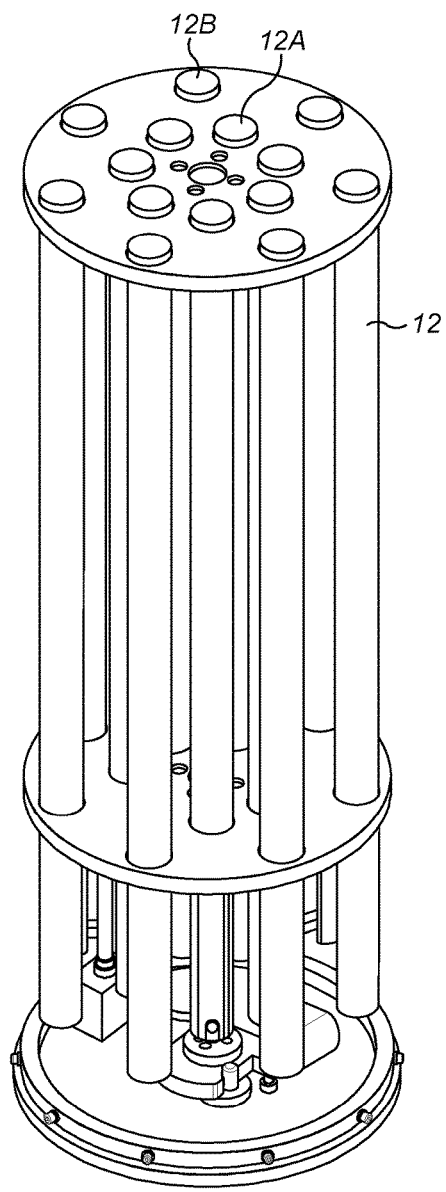
FIG. 4 is a perspective view of FIG. 3.
Figure 5:
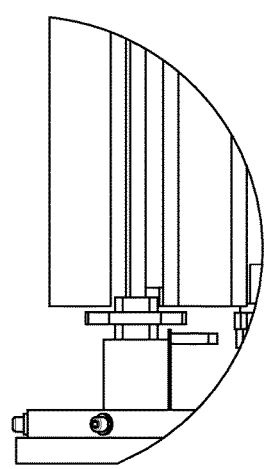
FIG. 5 is a detailed view of part A of FIG. 2.

The golf club carrier 10 includes a plurality of golf club receptacles 12 which may be constrained in position relative to each other by at least one holding plate 14 provided with openings through which its receptacles extend.

Separate ejectors or fingers may be provided that can be activated to raise each club as desired. Alternatively the receptacles may be rotatable relative to a base region 16. This rotational movement may be effected by a motor 18 which may rotate a drive gear 20 which in turn may rotate a driven gear 22. The driven gear may be mounted on a shaft 24 fast with the receptacles. The shaft rotates about an axis 26. Although not shown the carrier may include a plate at the lower region of the shaft or a rigid cover surrounding the receptacles or both that are fast with the shaft to add support for the receptacles.

Preferably the receptacles rotate and the base region does not rotate.

There is at least one inner receptacle 12A mounted radially inwards from at least one radially outward receptacle 12b. Preferably there are a plurality of inner and outer receptacles 12a and 12b. There may be seven inner and seven outer receptacles.

The plurality of inner receptacles may be on a common circumference about the axis 26 and the plurality of outer receptacles may also be about a common circumference about the axis 26. The radii of the inner receptacles may be offset from the radii of the outer receptacles.

Figure 6:
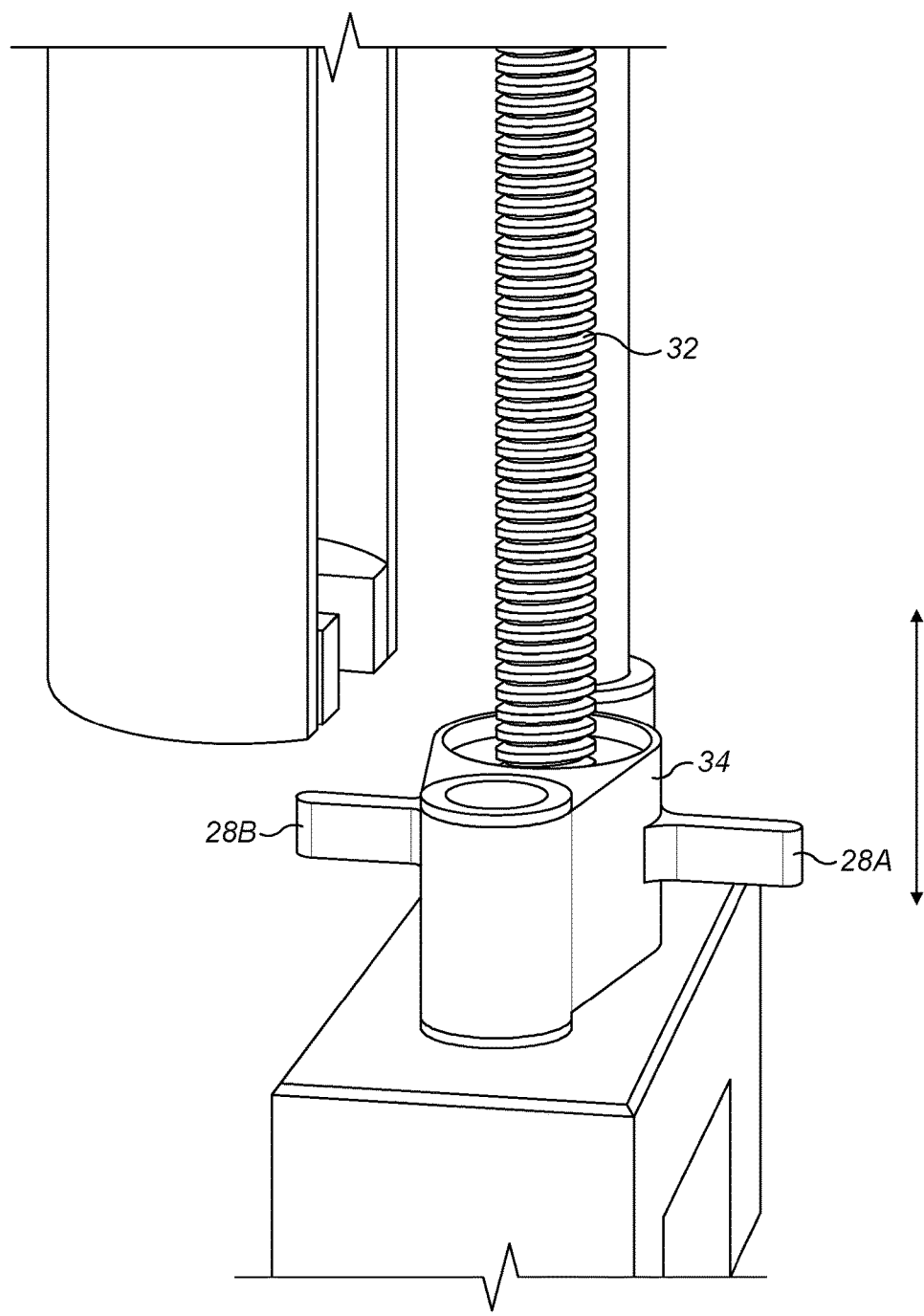
FIG. 6 is a detailed side view of a golf club ejector.

In use relative rotation of the base region and the receptacles occurs until a required club within a particular receptacle is located over an upwardly extending ejector of finger 28A or 28B of the club ejector. One or both fingers 28A and 28B may then be raised. As seen in FIG. 6 the fingers rise together with the finger 28B rising inside the selected receptacle 12b above a rim that supports the base of the club to push up on the underside of the club in a receptacle and to raise the club upwardly. The other finger 28A rises up in a space between the receptacles and has no effect on the clubs. Similarly when a club from the inner receptacle is to be raised the finger 28A rises up in a receptacle 12A to raise a club with the other finger 28B having no effect.

Here each receptacle includes at its base region a slot within which the ejector can slide. However, the clubs could also extend beneath the extent of the receptacle so that the ejector can act on the club.

Consequently a single actuator is required to raise either an inner club or an outer club 36. The single actuator is positioned between the inner and outer rings of receptacles. A finger extends from the actuator inwardly, to act on the inner ring of receptacles, and outwardly, to act on the outer row of receptacles. Here, because both the fingers raise simultaneously when the single actuator is operated, the arrangement of the receptacles on the inner and outer rings is such that when a receptacle on the inner ring is aligned with the actuator, for instance so that the finger raises within the slot, the receptacles on the outer ring are not in conflict with the outer finger. That is the radial spacing of the inner and outer receptacles is such that the receptacles on the opposed rings are off-set from one another.

As shown in FIG. 6 a vertical linear actuator may raise and lower the fingers simultaneously. The actuator may comprise a rotatably threaded shaft 32 that, when rotated, cooperates with a threaded control member 34 to raise or lower each finger 28A and 28B which are connected to the member 34. The radial distance between the inner and outer receptacles is such that the receptacles are clear of the threaded shaft when the receptacles rotate should the shaft project upwardly to be partially co-extensive with the receptacles. Other well known means actuator may be provided to raise and lower the fingers.

The fingers may lower such as after a predetermined period of time or upon receipt of a command or when a pressure sensor determines that the club has been lifted off the finger.

A user interface 36 may be provided which a golf player can actuate to request a desired club whereupon a receiver 38 on a carrier causes relative rotation of the carrier and a base region and the raising of the appropriate club.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A golf club carrier including
a plurality of receptacles each for receiving a golf club, at least some inner receptacles being mounted inwardly of at least some outer receptacles, and
at least two ejectors comprising an inner ejector and an outer ejector being arranged, in use, to rise and bear against and lift the base of a club in each receptacle as required,
wherein the inner and outer ejectors are arranged in use to rise simultaneously such that one ejector rises up into a receptacle and the other ejector passes upwardly between two receptacles.

2. The carrier as claimed in claim 1, including seven inner and seven outer receptacles.

3. The carrier as claimed in claim 1, wherein the receptacles are rotatable about an axis relative to a base region.

4. The carrier as claimed in claim 3, wherein the relative rotation is arranged, in use, to align a particular receptacle over an ejector in order that, in use, a club in that particular receptacle is able to rise.

5. The carrier as claimed in claim 3, wherein the inner receptacles are mounted about a circumference to the rotational axis, and the outer receptacles are mounted about a greater circumference to that axis than the inner receptacles.

6. The carrier as claimed in claim 3, wherein the outer dimension of the inner receptacles is spaced circumferentially from the outer dimension of the outer receptacles.

7. The carrier as claimed in claim 3, wherein the outer dimensions of the inner receptacles are spaced in a radial direction from the outer dimensions of the outer receptacles.

8. The carrier as claimed in claim 5, wherein each inner and each outer receptacle is spaced in a circumferential direction by a distance at least equal to the periphery of an inner and an outer ejector respectively.

9. A method of operating a golf club carrier, which includes a plurality of receptacles, at least some of which have a golf club therein, and at least some of the receptacles are inner receptacles mounted inwardly of at least some outer receptacles, the method comprising raising at least one club in one of the inner or outer receptacles by one of a plurality of ejectors comprising an inner ejector and an outer ejector, wherein the inner and outer ejectors are arranged in use to rise simultaneously such that one ejector rises up into a receptacle and the other ejector passes upwardly between two receptacles.

10. The method as claimed in claim 9, further comprising aligning a particular receptacle over an ejector by rotating the receptacles about an axis, and raising that ejector to cause a club in the receptacle to rise.

11. The method as claimed in claim 10, wherein
the inner receptacles are mounted about a circumference to the rotational axis, and
the outer receptacles are mounted about a greater circumference to that axis than the inner receptacles.

12. The method as claimed in claim 9, further comprising automatically lowering at least one ejector after a club has been removed from a particular receptacle.

13. The method as claimed in claim 9, wherein the plurality of ejectors are arranged, in use, to rise and bear against and lift the base of a club in each receptacle as required.

14. The method as claimed in claim 10, wherein the outer dimensions of the inner receptacles are spaced in a radial direction from the outer dimensions of the outer receptacles.

15. The method as claimed in claim 10, wherein the outer dimension of the inner receptacles is spaced circumferentially from the outer dimension of the outer receptacles.

16. The method as claimed in claim 11, wherein each inner and each outer receptacle is spaced in a circumferential direction by distance at least equal to the periphery of the inner and outer ejector, respectively.

17. A golf club carrier including
a plurality of receptacles each for receiving a golf club, at least some inner receptacles being mounted inwardly of at least some outer receptacles, and
at least two ejectors comprising an inner ejector and an outer ejector being arranged, in use, to rise and bear against and lift the base of a club in each receptacle as required,
wherein
the receptacles are rotatable about an axis relative to a base region,
the inner receptacles are mounted about a circumference to the rotational axis, and the outer receptacles are mounted about a greater circumference to that axis than the inner receptacles, and
each inner and each outer receptacle is spaced in a circumferential direction by a distance at least equal to the periphery of an inner and an outer ejector respectively.

* * * * *